J. W. GAMBLE.
LIQUID MEASURING APPARATUS.
APPLICATION FILED FEB. 20, 1913.
1,080,547.
Patented Dec. 9, 1913.
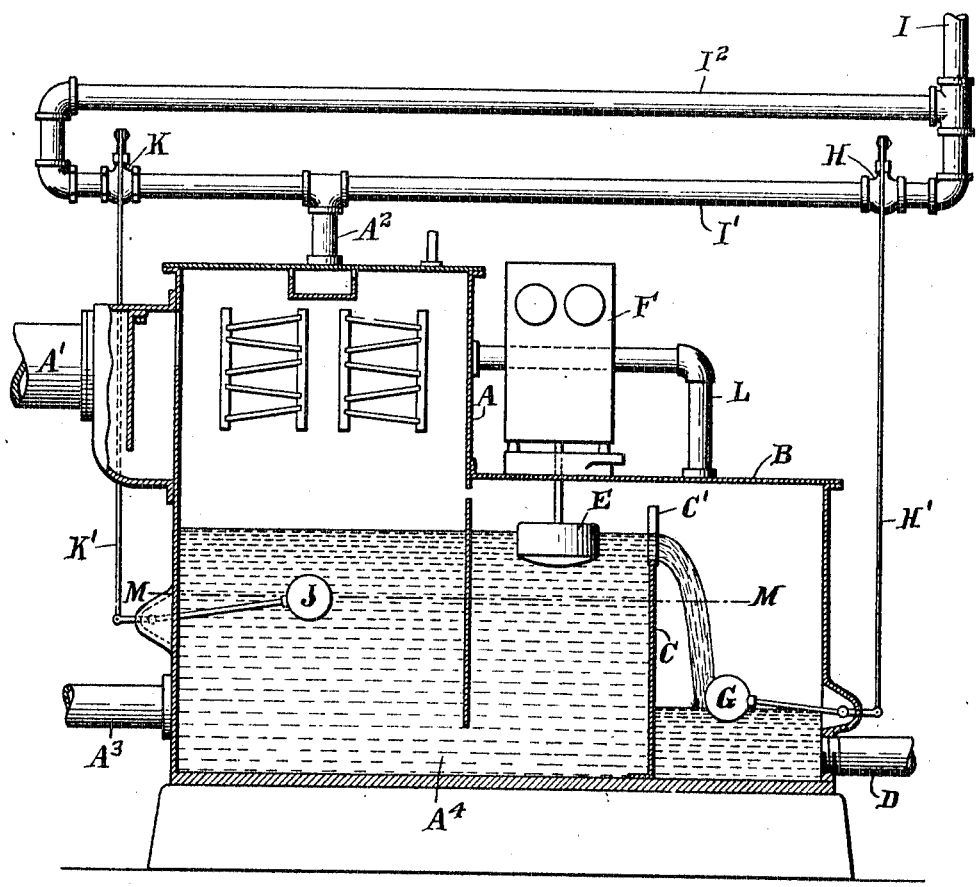

UNITED STATES PATENT OFFICE.

JOSEPH W. GAMBLE, OF PHILADELPHIA, PENNSYLVANIA, ASSIGNOR TO JOSEPH S. LOVERING WHARTON, WILLIAM S. HALLOWELL, AND JOHN C. JONES, ALL OF PHILADELPHIA, PENNSYLVANIA, DOING BUSINESS AS FIRM OF HARRISON SAFETY BOILER WORKS, OF PHILADELPHIA, PENNSYLVANIA.

LIQUID-MEASURING APPARATUS.

1,080,547. Specification of Letters Patent. Patented Dec. 9, 1913.

Application filed February 20, 1913. Serial No. 749,663.

*To all whom it may concern:*

Be it known that I, JOSEPH W. GAMBLE, a citizen of the United States of America, residing in the city and county of Philadelphia, in the State of Pennsylvania, have invented certain new and useful Improvements in Liquid-Measuring Apparatus, of which the following is a true and exact description, reference being had to the accompanying drawings, which form a part thereof.

My present invention relates to apparatus embodying means for measuring the amount of liquid flowing through a weir chamber by measuring the varying accumulation of water in the inlet compartment of the weir chamber.

With such apparatus it is sometimes desirable to utilize a portion of the liquid passing to the inlet compartment of the weir chamber or into a chamber or conduit in open communication therewith without passing it over the weir. For instance, it has been found desirable to employ a weir chamber in conjunction with a feed water heater for measuring the water passing from the heater to a boiler feed pump, while at the same time utilizing a portion of the water heated for other purposes and without passing it over the weir, so that the water measured will be solely that passing to the boiler feed pump.

The object of my present invention is to provide simple and effective means for regulating the admission of water to the inlet compartment of the weir chamber in such manner as to adequately supply both the measured and unmeasured water required and at the same time to prevent an accumulation of water on the outlet side of the weir which would interfere with the free flow over the latter and introduce inaccuracies in the measurements obtained. This I accomplish by providing the two water supply connections, which are in parallel with one another so to speak, and controlling the flow of water through one of these connections in response to the height of water level on the outlet side of the weir, and controlling the flow of water through the other communication in response to predetermined variations in height of water level on the inlet side of the weir, the last mentioned means being operative, however, to open the supply connection controlled by it only when the water level on the supply side of the weir is below the lowermost level of flow over the weir.

The various features of novelty which characterize my invention are pointed out with particularity in the claims annexed to and forming a part of this specification. For a better understanding of the invention, however, and of the advantages possessed by it, reference should be had to the accompanying drawing and descriptive matter, in which I have illustrated and described one form of apparatus embodying my invention.

The one figure of the drawing is a somewhat diagrammatic representation, with parts in sectional elevation, of a combined water heating and metering apparatus, constructed in accordance with my present invention.

In the drawing A represents a feed water heater provided with the usual steam inlet A′, and water inlet $A^2$ at its upper end, and provided at its lower end with an outlet port $A^4$ leading to the inlet compartment of a weir chamber B. The heater is also provided with an outlet connection $A^3$ for water to be utilized without passing through the weir chamber. Within the weir chamber and separating the inlet and outlet compartments of the latter is a weir C which may be notched at its upper edge, as indicated at C′, in the usual manner and over which the water flows from the inlet to the outlet compartment of the weir chamber.

D represents a water discharge pipe leading from the outlet compartment of the weir chamber to a boiler feed pump or other place or device for utilizing the heated and measured water passing over the weir.

E represents a float rising and falling with the water level on the supply side of the weir, and serving to actuate indicating or recording mechanism located within the casing F.

L represents a vapor equalizing connection between the upper end of the heater and the vapor space in the weir chamber.

To prevent the water level in the outlet compartment of the weir from building up to a height at which it would interfere with the free flow of the water from the weir, a float G, rising and falling with the water level in the outlet compartment of the weir chamber, is connected to and operates a valve H located in the conduit I' connecting the water supply pipe I to the heater inlet connection A². The float G and operating connections between the latter and the valve H are so adjusted that the valve H will be closed when the water level on the outlet side of the weir rises to a predetermined maximum which should be below that at which the water on the outlet side of the weir would interfere with the free flow of water over the weir. When the water level on the outlet side of the weir falls below said predetermined maximum the valve H opens thus permitting water to flow into the heater through the conduit I'. With this arrangement it will be apparent that so long as water is being withdrawn from the weir chamber through the pipe D, no matter how slow the rate of flow through the pipe D may be, the float G will keep the valve H open so that water will be supplied by the pipe I' at a rate fast enough to maintain the water level on the supply side of the weir above the lowermost level of flow over the weir. When the flow through the pipe D entirely ceases, however, and the water level on the discharge side of the weir rises to the predetermined maximum the valve H will be entirely closed, and will remain closed until the water level on the discharge side of the weir is again lowered.

To supply the demand for water withdrawn from the heater through the connection A³ after the valve H is closed, I provide a second pipe connection I² between the main water supply pipe I and the water inlet A² of the heater. This pipe connection which forms a by-pass about the valve H, contains a valve K connected to and operated by a float J responsive to predetermined variations in the height of water level on the supply side of the weir. The float J and the connections between it and the valve K are adjusted to open and close the valve K as the water level on the inlet side of the weir falls below and rises to a predetermined level which is below the lowermost level at which flow over the weir occurs. In the drawing the water level on the supply side of the weir at which the valve K will commence to open is indicated by the line M—M.

It will be apparent without further explanation that so long as water is being withdrawn from the weir chamber through the pipe D, the supply of water to the heater from the supply pipe I will be entirely controlled by the valve H and float G, and that when the outflow of water through the pipe D entirely ceases and the valve H is entirely shut off the float J will open the by-pass valve K to supply the demand for water withdrawn through the outlet passage A³.

While in accordance with the provisions of the statutes, I have illustrated and described the best form of my invention now known to me, it will be apparent to those skilled in the art that changes may be made in the form of the apparatus disclosed, without departing from the spirit of my invention, and that under some conditions certain features of my invention may be used without a corresponding use of other features.

Having now described my invention, what I claim as new and desire to secure by Letters Patent, is:

1. In a liquid measuring apparatus, the combination of a weir, a weir chamber divided into inlet and outlet compartments by the said weir, separate liquid discharge outlets from the two compartments, a liquid supply connection to said inlet compartment, means responsive to the height of liquid level in said outlet compartment for opening and closing said connection as the liquid level in said outlet compartment falls below and rises to a predetermined height, a second liquid supply connection to said inlet compartment, and means responsive to the height of liquid level in said inlet compartment for opening and closing said second connection as the liquid in said inlet compartment falls below and rises to a predetermined level below the lowermost level of flow over the weir.

2. In a liquid measuring apparatus the combination of a weir, a weir chamber divided into inlet and outlet compartments by said weir, separate liquid discharge outlets from the two compartments, a liquid supply connection to said inlet compartment, a valve controlling the flow through said connection, means responsive to the height of liquid level in said outlet compartment for opening and closing said valve as the liquid level in the outlet compartment falls below and rises to a predetermined maximum, a by-pass connection about said valve, a second valve controlling the flow through said by-pass, and means responsive to the height of liquid level in said inlet compartment for opening and closing said second valve as the liquid level in said inlet compartment falls below and rises to a predetermined level below the lowermost level of flow over the weir.

JOSEPH W. GAMBLE.

Witnesses:
ROBERT G. CLIFTON,
W. ATWOOD MEHARG.